[11] 3,624,816

[72] Inventors Richard R.
Roland A. Phaneuf, both of Sturbridge, Mass.
[21] Appl. No. 6,470
[22] Filed Jan. 28, 1970
[45] Patented Nov. 30, 1971
[73] Assignee American Optical Corporation
Southbridge, Mass.

[54] FLEXIBLE FIBER OPTIC CONDUIT
5 Claims, 7 Drawing Figs.
[52] U.S. Cl. .................................. 350/96 B, 65/3, 65/4, 65/31, 65/DIG. 7
[51] Int. Cl. .................................. G02b 5/16
[50] Field of Search ........................... 350/96 B; 65/3, 4, 31, DIG. 7

[56] References Cited
UNITED STATES PATENTS
3,004,368  10/1961  Hicks .......................... 350/96 B X Attorneys—William C. Nealon, Noble S. Williams and Robert J. Bird ABSTRACT: A flexible fiber optic conduit formed of a multiplicity of juxtaposed light-conducting fibers all connected together adjacent opposite ends of the conduit by a matrix of silica-free acid soluble glass with said connecting glass having been leached from the intermediate portion of the bundle leaving corresponding lengths of individual fibers thereof unconnected and free to flex individually. Short lengths of semiflexible heat-shrunken plastic tubing tightly surround transitional zones between unconnected and connected together portions of the individual fibers adjacent opposite ends of the conduit. These lengths of tubing strengthen and protect the aforesaid transitional zones against undue breakage during use of the conduit as a light and/or image transmitting device.

PATENTED NOV 30 1971  3,624,816
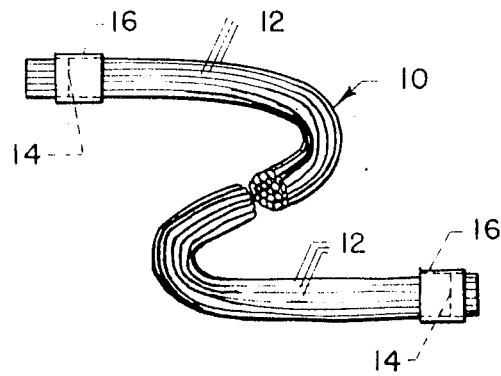
FIG. 1
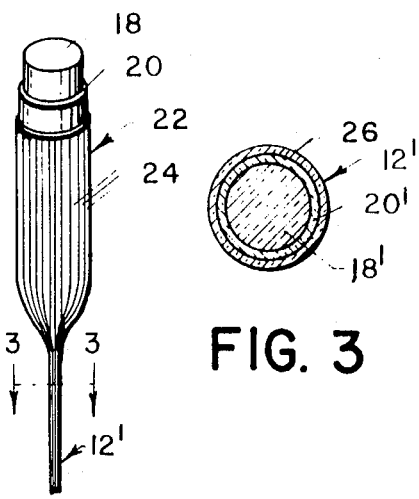
FIG. 2
FIG. 3
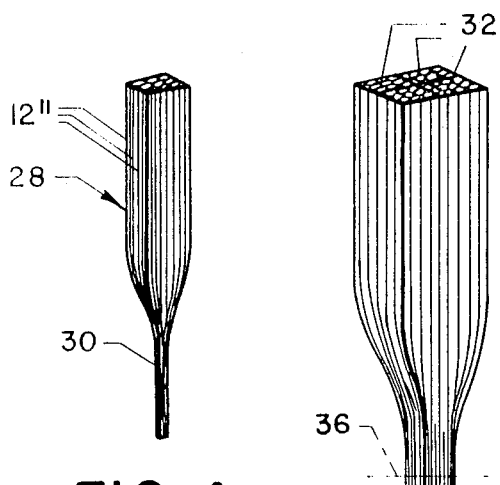
FIG. 4
FIG. 5
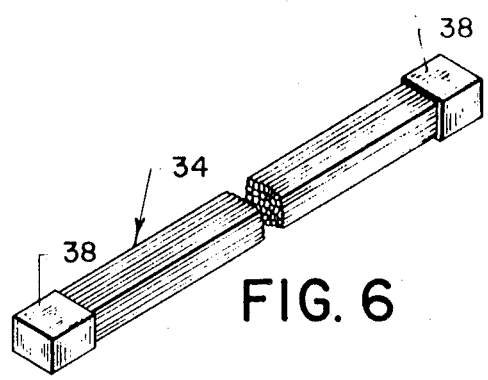
FIG. 6
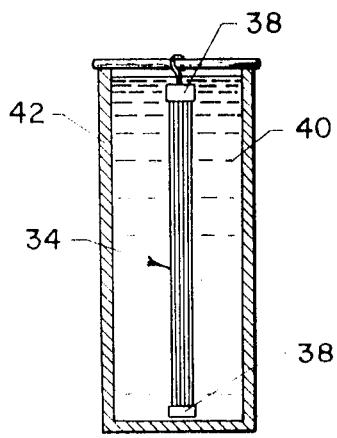
FIG. 7
INVENTOR.
RICHARD R. STRACK
ROLAND A. PHANEUF
BY
Noble T. Williams
ATTORNEY

FLEXIBLE FIBER OPTIC CONDUIT

BACKGROUND OF THE INVENTION

1. Field of the Invention

Fiber optics with particular reference to flexible light and/or image-conducting fiber optic conduits.

2. Description of the Prior Art

Flexible fiber optic light and/or image conduits produced by leaching matrix glasses from between intermediate lengths of the fibers according to the technique shown and described in U.S. Pat. No. 3,004,368, for example, have been found to be very susceptible to individual fiber breakage, a major cause of which has been determined to be silica residue of matrix glasses hereto fore used in fabrication of the devices. Silica particles which remain between the leached fibers as a result of the use of connecting glasses which are not completely soluble have been found to render fiber optic bundles susceptible to fiber breakage and, accordingly, inferior.

The present invention, in dealing with completely soluble silica-free acid-soluble glasses as fiber matrix material and a technique for utilizing same in the manufacture of leached flexible fiber optic conduit, relates more particularly to improvements in flexible fiber optic light and/ or image conducting devices, the latter being commonly referred to as fiberscopes.

SUMMARY OF THE INVENTION

According to the present invention, flexible fiber optic light-conducting conduit of improved strength and having enhanced light-conducting and/or image-transmitting capabilities is produced by first forming a supply of glass fiber having a high refractive index core, lower refractive index cladding and an additional second cladding of silica-free acid-soluble glass. Many lengths of the double-clad fiber are arranged in side-by-side bundled relationship with each other and fused together as a multifiber wherein their second claddings constitute a connecting glass of matrix between the individual fibers. In order to reduce the element size of individual lengths of fiber in the multifiber to a practical or desired minimum, the multifiber is heated, drawn and cut into relatively short lengths which are assembled in bundled side-by-side relationship with others and again drawn to at least the length and approximate cross-sectional size desired of the fiber optic conduit to be produced.

Opposite ends of the length of the fused multi-multifiber unit are coated with an acid-resistant material such as wax and the unit is immersed in an etching solution for a period of time sufficient to leach the fiber-connecting matrix glasses from between all fibers throughout the intermediate uncoated sections of the multi-multifiber unit.

The unit, now being flexible intermediately of its coated opposite ends, is rinsed to remove residue of the leaching solution. The protective coatings at opposite ends are removed and short lengths of reinforcing heat shrinkable semiflexible plastic tubing are placed over and shrunken onto ends of the now flexible light-conducting conduit where the transition between fusion and separation of the fibers occurs.

The flexible conduit, as such, may then be placed within a protective sheathing, fitted with image-forming and image-receiving lens means at opposite ends thereof and/or otherwise modified according to its intended usage.

The present invention, which relates more particularly to the basic fiber optic structure of the conduit, will be more fully understood by reference to the following detailed description when taken in conjunction with the accompanying drawings.

DESCRIPTION OF THE DRAWINGS

FIG. 1 illustrates a preferred embodiment of the present invention;

FIG. 2 is a diagrammatic illustration, in perspective, of an assembly of components useful in the manufacture of optical fibers for the fabrication of flexible light-conducting conduit according to principles of the present invention;

FIG. 3 is an enlarged cross-sectional view taken along line 2—2 of FIG. 2;

FIG. 4 is a diagrammatic illustration, in perspective, of a technique for forming multifibers;

FIG. 5 is a diagrammatic illustration, in perspective, of a unit comprised of a number of juxtaposed multifibers arranged for fabrication of the light-conducting conduit;

FIG. 6 is a perspective illustration of a semifinished conduit; and

FIG. 7 is a diagrammatic illustration of a step in the processing of the semifinished conduit.

DESCRIPTION OF THE PREFERRED EMBODIMENTS

Referring more particularly to FIG. 1 wherein a flexible fiber optic conduit 10 exemplifies the general type of structure to which this invention is more particularly directed, it is pointed out that the conduit is formed of a great multiplicity of juxtaposed individually light-insulated light-conducting fibers 12.

In this embodiment of the invention the fibers 12, initially having been connected together throughout their entire length by a leachable matrix glass, were rendered individually flexible throughout the intermediate section of their respective lengths by removal of the leachable matrix glass therealong. Remaining matrix glass at opposite ends of the conduit maintains the integrity of conduit 10.

This high-strength fused glass bonding of fibers 12 at opposite ends of the conduit renders it useful in a wide range of environmental temperatures reaching as high as those approaching normal glass-softening temperatures. Additionally, the matrix glass used in fabrication of fiber optic conduit according to principles of this invention comprises an acid-soluble composition which is silica-free wherewith the overall strength and resistance to breakage during use of conduit 10 is greatly improved by the avoidance of occurrences of silica and other residue in leached sections of the conduit at or near transitional zone between fused and the unfused lengths of the fibers.

Heretofore, residual silica and/or other deposits remaining between individually separated fibers of similar prior art devices have rendered such devices inferior as a result of their tendency for fiber breakage due to abrasion or interference in bending of the fibers caused by the residual silica during flexing of the conduit.

In addition to the elimination of abrasive or interfering residue in a fiber optic conduit 10 produced according to the present invention, reinforcement of its transitional zones, represented by dotted lines 14 in FIG. 1, is accomplished by fitting sections 16 of heat shrinkable semiflexible plastic tightly around the zones 14.

It is to be understood that conduit 10 (FIG. 1) may be variously additionally modified according to its intended use by the addition of a flexible sheathing of plastic, woven and/or linked metal or the like and the adaption of image-forming objective and eyepiece lens systems at opposite ends or by the provision of coupling means at such ends for connecting the conduit, as a light pipe, to light emitting and receiving stations. The light-conducting fibers 12 of conduit 10 may be randomly arranged in their juxtaposed relationship whereby the conduit may serve simply as a light receiving and transmitting device or these fibers may, as it is well known in the art, have their opposite ends prearranged in identically geometrical patterns thereby rendering the conduit useful as an optical image transmitter.

The fabrication of conduit 10 may be accomplished in the manner diagrammatically illustrated in FIGS. 2–6 wherewith greater details of the structural features of conduit 10 are shown.

The fabrication of optical fiber stock 12' of a type useful in the manufacture of conduit such as that exemplified in FIG. 1 is accomplished by positioning a rod 18 of high refractive index glass within a relatively thin-walled tube 20 of glass having a lower refractive index than that of the rod and surrounding tube 20 with a thickness of silica-free acid-soluble glass 22. Glass 22 is preferably initially in the form of long and thin strips 24 surrounding tube 20 which occupy approximately 15 percent of the total cross-sectional area of the assembly including rod 18 and tube 20. Glass 22 may alternatively be in the form of a tube or a coating applied to tube 20. Glass 22, tube 20 and rod 18 are so preselected as to have compatible coefficients of expansion and softening temperatures.

The assembly of the aforementioned components 18, 20 and glass 22 is heated and drawn down as a unit by conventional fiber optic heating and drawing techniques to optical fiber size wherewith, the glasses of components 18, 20 and 24 become integrally fused together into the form of double-clad optical fiber stock material 12', and enlarged cross section of which is depicted by FIG. 3. This optical fiber stock 12' is comprised of light-transmitting core 18' of high-refractive index glass, a first cladding 20' of lower refractive index glass wherewith core 18' is rendered totally internally reflective to light and a second or outer integrated cladding of matrix glass 22 formed of the fused together strips 24.

In building the structure of conduit 10, optical fiber stock 12' is cut or broken into lengths 12" which may be conveniently assembled into bundle 28 (FIG. 4). Bundle 28 is heated and drawn into fused multifiber 30 wherewith a multiplicity of fibers 12 each consisting of the core and cladding material 18' and 20' of stock 12' are fused together by the matrix glass 22 and simultaneously reduced in cross-sectional size.

In order to further reduce the cross-sectional size of individual fibers 12 and, at the same time, form the basic structure of conduit 10 having a desired or required relatively large cross-sectional size, a number of sections 32 of the length of multifiber 30 are placed in side-by-side relationship and heated and drawn to the particular cross-sectional size desired of conduit 10 (see FIG. 5). This drawing operation produces a rigid bundle 34 of a great multiplicity of optical fibers 12 all fused together by matrix glass 22. This bundle 34 of fused fibers 12 is then cut from the assembly of sections 32, e.g. along line 36, whereupon its opposite ends are ground and optically polished or allowed to remain as such and subsequently ground and polished. In either case, opposite ends of bundle 34 are dipped or otherwise coated with an acid resistant material such as wax so as to provide protective coverings 38 wherewith the remaining intermediate portion of the bundle may be directly exposed to a suitable acid for leaching substantially all matrix glass 22 therefrom without damage to fibers 12 or removal of the matrix glass beneath protective coverings 38.

The leaching of matrix glass 22 is accomplished by immersing bundle 34 in a leaching solution 40 preferably in the manner illustrated by FIG. 7 wherein bundle 34 is extended vertically within a tank 42 containing leaching solution 40.

Following the removal of matrix glass 22, bundle 34 is removed from tank 42 and rinsed clean of leaching solution 40. Protective coverings 38 are then melted away or otherwise removed (e.g. dissolved in chloroform) and the pieces of heat-shrinkable tubing 16 are applied to the structure as described hereinabove to complete the flexible conduit 10 of FIG. 1.

A highly desirable and useful exemplary matrix glass composition is the following:

47% (by weight)—boron trioxide ($B_2O_3$)
45% (by weight)—barium oxide (BaO)
5% (by weight)—lanthanum oxide ($La_2O_3$)

Removal of the aforesaid exemplary silica-free glass, according to the above-described technique of leaching may be accomplished in a leaching solution of 5 percent (by volume) hydrochloric acid maintained at a temperature at approximately 65° C., it being understood that this temperature and concentration of acid, while being highly conducive to efficient leaching, may be varied if desired.

With a total amount of silica-free glass in the rigid bundle 34 occupying approximately 15 percent of its cross-sectional area, approximately 1 hour of leaching time per square millimeter of bundle cross section is required for complete removal of the silica-free glass. A suitable rinse for cleaning bundle 34 of hydrochloric acid is, for example, acetone.

It is particularly pointed out that the present invention features the use of a silica-free glass in the fabrication and final structure of conduit 10 whereby the finished conduit is of improved strength and durability having enhanced light-conducting and/or image-transmitting capabilities as a result of minimal fiber breakage occurring during use due to the absence of silica residue and/or other particulate matter between fibers in the leached structure.

We claim:

1. A flexible fiber optic conduit formed of a great multiplicity of juxtaposed light-conducting fibers each having a light-conducting core of high refractive index glass immediately surrounded by a relatively thin cladding of glass having a lower refractive index, said fibers being connected together adjacent opposite ends of the conduit by a matrix glass of compatible softening temperature and coefficient of expansion, the conduit being characterized by the improvement of:

said matrix glass being silica-free and substantially completely cleanly leached from the intermediate section of the length of said conduit between said opposite ends thereof whereby said conduit is rendered flexible and free of obstructive and abrasive residue between individual fibers throughout said intermediate section including the areas of transition between connected and unconnected portions of the length of the fibers adjacent said opposite ends of said conduit.

2. A flexible fiber optic conduit according to claim 1 wherein corresponding opposite ends of said fibers are substantially identically geometrically patterned.

3. A flexible fiber optic conduit according to claim 1 wherein corresponding opposite ends of said fibers are randomly differently geometrically patterned.

4. A flexible fiber optic conduit according to claim 1 further including lengths of tightly fitted plastic tubing surrounding said areas of transition for strengthening same.

5. A flexible fiber optic conduit according to claim 4 still further including a flexible sheath extending along at least the major portion of the length of said conduit.

* * * * *